United States Patent
Tsuda

(10) Patent No.: US 9,500,338 B2
(45) Date of Patent: Nov. 22, 2016

(54) VEHICLE LAMP

(71) Applicant: KOITO MANUFACTURING CO., LTD., Tokyo (JP)

(72) Inventor: Toshiaki Tsuda, Shizouka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 14/695,580

(22) Filed: Apr. 24, 2015

(65) Prior Publication Data
US 2015/0323148 A1 Nov. 12, 2015

(30) Foreign Application Priority Data

May 8, 2014 (JP) ................................ 2014-096931

(51) Int. Cl.
| F21S 8/10 | (2006.01) |
| F21V 23/04 | (2006.01) |
| B60Q 1/00 | (2006.01) |
| B60Q 1/068 | (2006.01) |
| F21W 101/10 | (2006.01) |
| F21Y 101/00 | (2016.01) |

(52) U.S. Cl.
CPC ......... *F21S 48/1721* (2013.01); *B60Q 1/0023* (2013.01); *B60Q 1/0683* (2013.01); *F21K 9/64* (2016.08); *F21S 48/115* (2013.01); *F21S 48/1145* (2013.01); *F21S 48/125* (2013.01); *F21S 48/1216* (2013.01); *F21S 48/1258* (2013.01); *F21V 23/0492* (2013.01); *F21W 2101/10* (2013.01); *F21Y 2101/00* (2013.01)

(58) Field of Classification Search
CPC ............. F21S 48/1721; F21S 48/1145; F21S 48/125; F21S 48/115; F21S 48/1216; F21S 48/1258; F21K 9/56; B60Q 1/0023; B60Q 1/0683; F21V 23/0492; F21W 2101/10; F21Y 2101/02
USPC .................................. 362/512, 513, 520, 521
See application file for complete search history.

(56) References Cited

U.S. PATENT DOCUMENTS

| 5,068,768 A * | 11/1991 | Kobayashi .......... F21S 48/1233 362/268 |
| 6,059,428 A * | 5/2000 | Perlo ........................ F21L 4/00 362/169 |
| 6,425,683 B1 * | 7/2002 | Kusagaya ............. F21S 48/145 362/324 |
| 6,634,778 B2 * | 10/2003 | Tatsukawa ............... B60Q 1/18 362/233 |
| 2015/0030588 A1 * | 1/2015 | Jessen .................... C12Q 1/485 424/133.1 |

FOREIGN PATENT DOCUMENTS

JP 2003-317513 A 11/2003

* cited by examiner

*Primary Examiner* — Laura Tso
(74) *Attorney, Agent, or Firm* — Sughrue Mion, PLLC

(57) ABSTRACT

A vehicle lamp includes a plurality of lamp units each comprising a light source and a projection lens configured to emit light emitted from the light source to the front. The plurality of lamp units form a light distribution pattern by combining irradiation regions formed by each lamp unit. At least one of the lamp units has a lens driving mechanism configured to tilt the projection lens in a vertical direction.

4 Claims, 6 Drawing Sheets

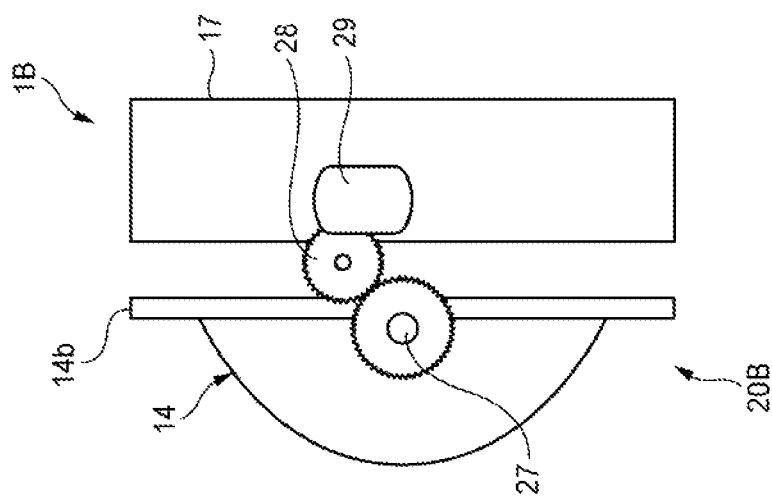
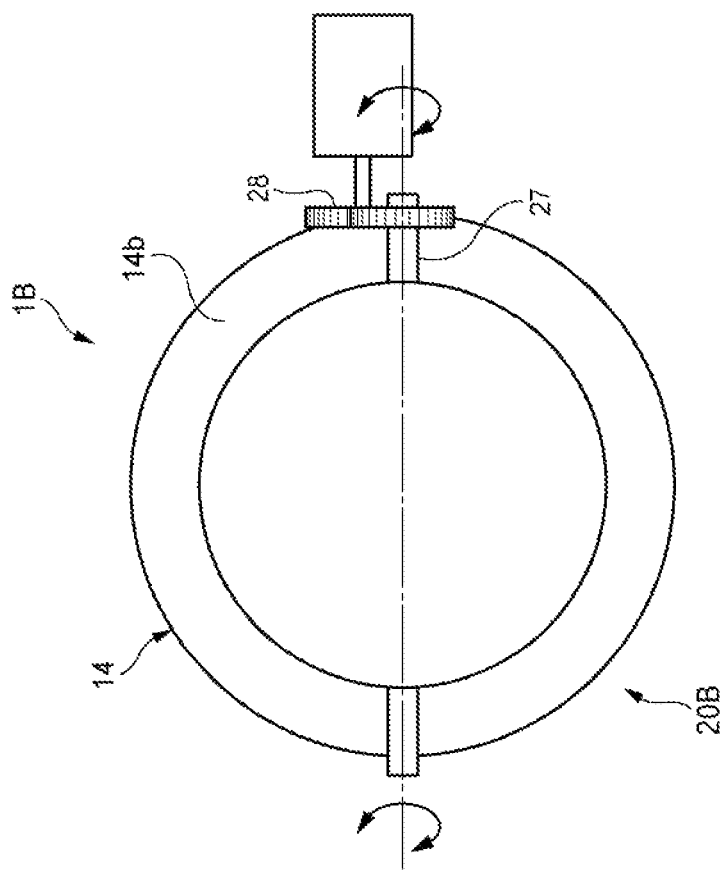

VEHICLE LAMP

CROSS-REFERENCE TO RELATED APPLICATION

The present application claims priority from Japanese Patent Application No. 2014-096931 filed on May 8, 2014, the entire content of which is incorporated herein by reference.

BACKGROUND

Technical Field

The present disclosure relates to a vehicle lamp.

Related Art

In Patent Document 1 or the like, a vehicle lamp having a plurality of lamp units each emitting light forward is known. In this vehicle lamp, respective irradiation regions are combined to form a light distribution pattern such as a low-beam light distribution pattern.

PRIOR ART LITERATURE

Patent Document

Patent Document 1: Japanese Patent Laid-Open Publication No. 2003-317513

In such a vehicle lamp, a precise alignment of respective irradiation regions is required. For example, in a case where the upper sides of the respective irradiation regions are deviated from each other in the vertical direction at the time of forming a low-beam light distribution pattern, a step occurs in cutoff lines. Accordingly, a user feels a discomfort.

Therefore, in order to accurately combine the respective irradiation regions, a high dimensional accuracy is required for the components constituting the lamp, or high assembly accuracy is required.

SUMMARY

Exemplary embodiments of the invention provide a vehicle lamp which forms a light distribution pattern by combining the irradiation regions of the plurality of lamp units and in which the vertical positions of the respective irradiation regions can be accurately aligned.

A vehicle lamp according to an exemplary embodiment comprises:

a plurality of lamp units each comprising a light source and a projection lens configured to emit light emitted from the light source to the front, wherein the plurality of lamp units form a light distribution pattern by combining irradiation regions formed by each lamp unit, and at least one of the lamp units has a lens driving, mechanism configured to tilt the projection lens in a vertical direction.

According to the vehicle lamp of the present invention, the deviation of the irradiation regions can be eliminated by the lens driving mechanism without improving the assembly accuracy. As a result, it is possible to form a light distribution pattern having a desired shape.

An area of the projection lens may be 1000 $min^2$ or less, as seen in a front view.

Generally, in a vehicle lamp unit that utilizes a plurality of small lamp units using a small lens, a deviation of the irradiation regions is liable to occur. However, according to the present invention, the lens driving mechanism can be used to align multiple irradiation regions so that the light distribution pattern formed by combining the multiple irradiation regions has a desired shape. Further, since the projection lens is lightweight, it is possible to reduce a driving force of the lens driving mechanism.

The projection lens may be made of resin.

Since the projection lens is lightweight, an output of the lens driving mechanism to be required can be reduced.

The lens driving mechanism may have a sensor configured to detect the light emitted from the light source.

According to the present invention, the failure of the light source can be detected by the sensor. Further, the sensor can be provided in the vehicle lamp without requiring a separate structure for supporting the sensor.

The light source may comprise a semiconductor light emitting element and a phosphor layer having phosphors to emit fluorescence by receiving the light emitted from the semiconductor light emitting element, and the sensor detects at least one of the intensity of the light emitted from the semiconductor light emitting element and the intensity of the fluorescence.

When the phosphor layer is broken, the intensity of light emitted from the semiconductor light emitting element is increased or the fluorescence is weakened. According to the present invention, it is possible to detect the breakage of the phosphor layer by the sensor.

According to the present invention, it is possible to provide a vehicle lamp which forms a light distribution pattern by combining the irradiation regions of the plurality of lamp units and in which the vertical positions of respective irradiation regions can be accurately aligned.

BRIEF DESCRIPTION OF THE DRAWINGS

FIGS. 6A and 6B are views showing a portion of a vehicle lamp according to a second modified example of the present invention.

DETAILED DESCRIPTION

Hereinafter, a vehicle lamp according to an exemplary embodiment of the present invention will be described in detail with reference to the drawings. A vehicle lamp of the present embodiment is a lamp provided on the front of a vehicle.

Figure 1:
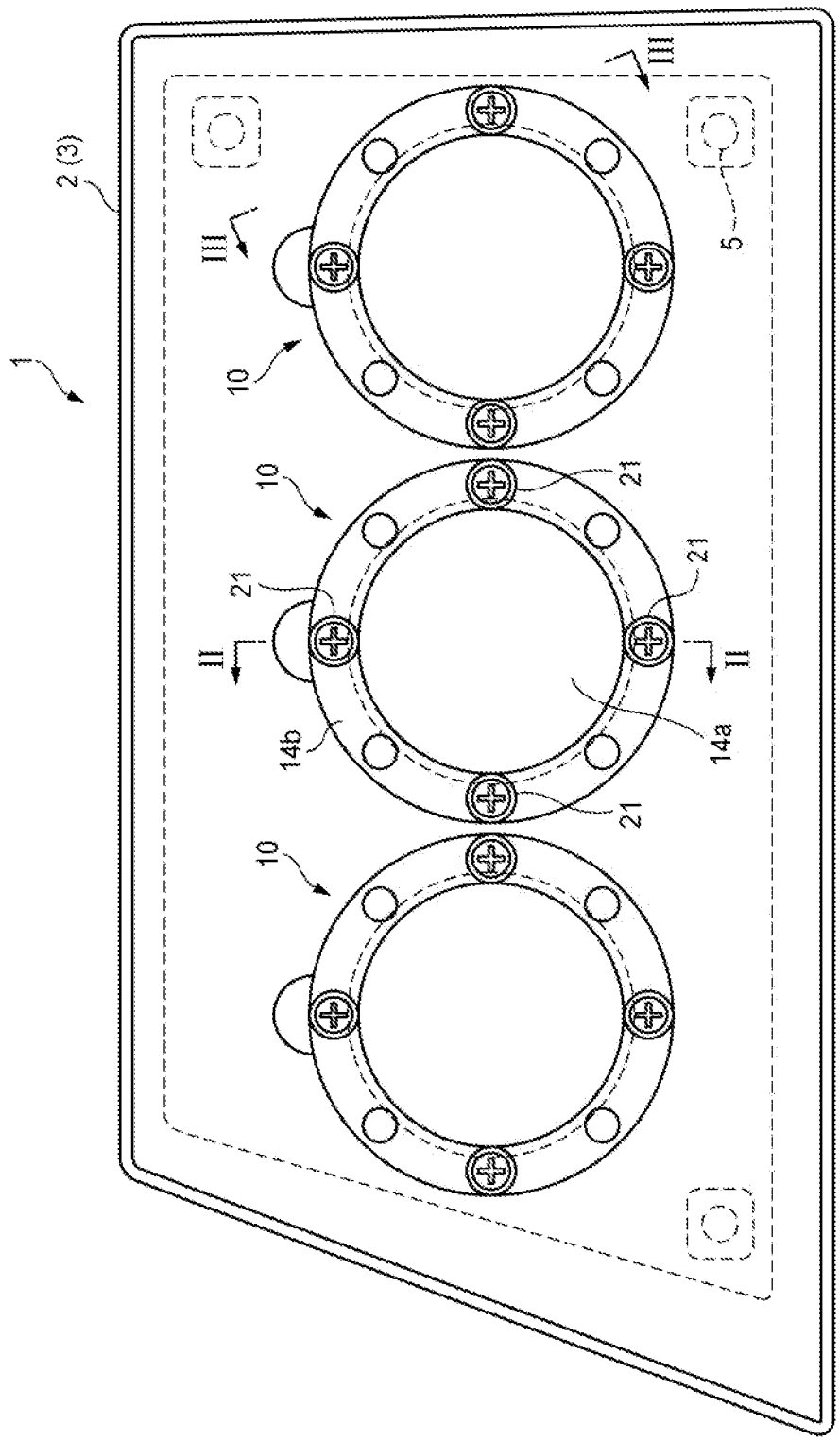
FIG. 1 is a front view of a vehicle lamp according to an exemplary embodiment of the present invention.
Figure 2:
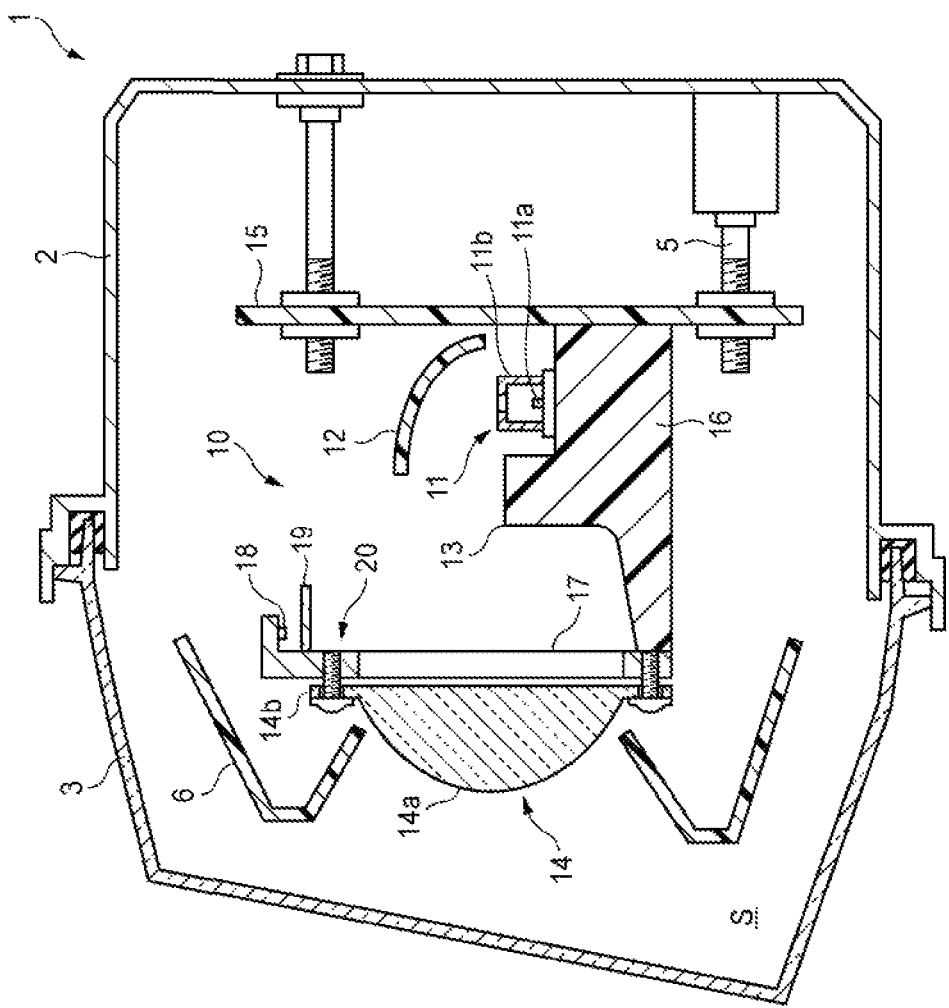
FIG. 2 is a view taken along a line II-II of FIG. 1.

FIG. 1 is a front view of a vehicle lamp 1 according to the present embodiment. FIG. 2 is a view taken along a line of FIG. 1. In FIG. 1, an extension 6 (see FIG. 2) is omitted.

The vehicle lamp 1 shown in FIG. 1 is disposed on the left portion of the front of a vehicle. The vehicle lamp 1 includes a plurality of (three in the example shown) lamp units 10. The plurality of lamp units 10 are arranged in the horizontal direction. The vehicle lamp 1 forms a low-beam light distribution pattern by combining irradiation regions formed by three lamp units 10.

FIG. 2 is a sectional view taken along the line II-II of FIG. 1. As shown in FIG. 2, the vehicle lamp 1 includes a housing 2 that has an opening portion in the front, and an outer cover 3 that closes the opening portion to form a lamp chamber S together with the housing 2. The lamp unit 10 is provided in the interior of the lamp chamber S. The lamp unit 10 is supported to a support board 15. The support board 15 is fixed to the housing 2 via an aiming screw 5.

The lamp unit 10 includes a light source unit 11, a reflector 12, a shade part 13, a projection lens 14, the support board 15, a light source holder 16 and a lens holder 17.

The light source unit 11 includes a laser diode 11a and a phosphor layer 11b. The laser diode 11a is mounted on an upper surface of the light source holder 16. The phosphor layer 11b is mounted on the upper surface of the light source holder 16 so as to cover an upper surface of the laser diode 11a. The laser diode 11a emits a blue light. A portion of the light emitted from the laser diode 11a emits a yellow fluorescence when passing through the phosphor layer 11b, and the other portion thereof passes through the phosphor layer 11b. In this way the light source unit 11 emits a white light by mixing the blue light and the yellow light.

The reflector 12 is fixed to the upper surface of the light source holder 16 so as to cover the upper side of the light source unit 11. The reflector 12 has a spheroidal reflecting surface. The reflector 12 reflects the light emitted from the light source unit 11 to the projection lens 14.

The projection lens 14 is a lens made of resin. The projection lens 14 is disposed on the front of the light source unit 11. The projection lens 14 is fixed to the lens holder 17 that is fixed to a front surface of the light source holder 16. The projection lens 14 emits the light emitted from the light source unit 11 toward the front.

The projection lens 14 includes a lens portion 14a and a flange portion 14h. The lens portion 14a emits the incident light to the front and the flange portion 14b is spread in a radial direction from a rear end of the lens portion 14a. The lens portion 14a has an area of 1000 mm$^2$ or less, as seen in a front view. Preferably, the lens portion 14a has an area of 500 mm$^2$ or less, as seen in a front view. The area of the lens portion 14a shown in FIG. 1 is 300 mm$^2$, as seen in a front view.

The upper front portion of the light source holder 16 has a recessed shape. A ridge of the recessed shape constitutes the shade part 13. The shade part 13 has a shape corresponding, to a cutoff line of a low-beam light distribution pattern described later.

The light emitted from the light source unit 11 is reflected by the reflector 12 and directed toward the projection lens 14. Then, the light is emitted to the front of the lamp by the projection lens 14. The shade part 13 blocks a portion of the light reflected from the reflector 12. In this way, the cutoff lines of the low-beam light distribution pattern are formed.

(Lens Driving Mechanism)

Figure 3:
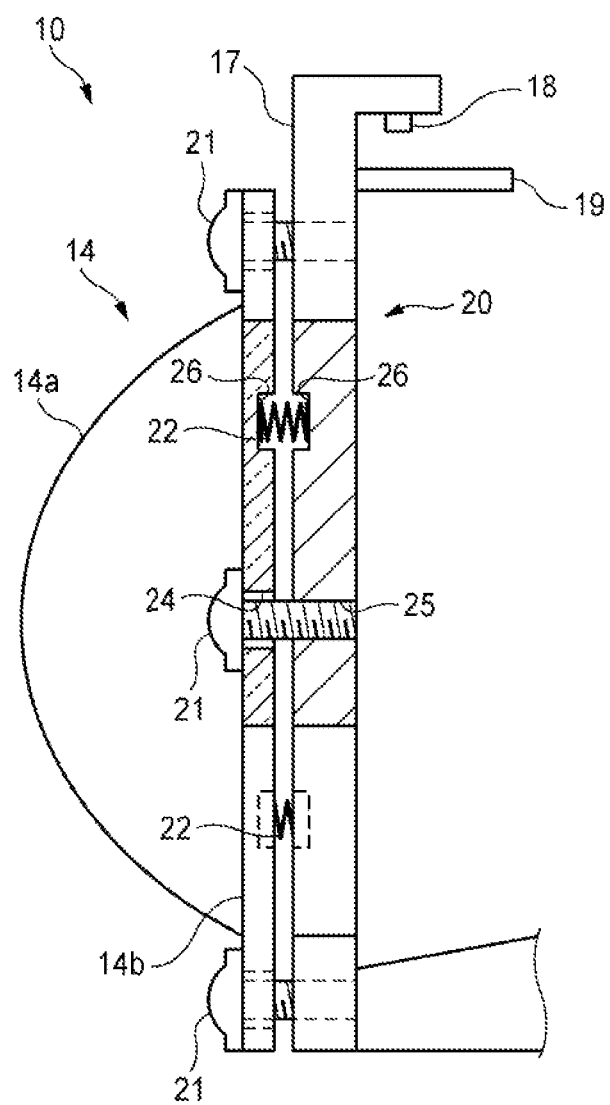
FIG. 3 is a view taken along a line III-III of FIG. 1.

FIG. 3 is a view taken along the line III-III of FIG. 1. As shown in FIG. 3, the lens unit 10 includes a lens driving mechanism 20. The lens driving mechanism 20 includes a plurality of adjustment screws 21 and a plurality of springs 22. The projection lens 14 is supported to the lens holder 17 through the adjustment screws 21 and the springs 22. The lens holder 17 is an annular metal plate.

The flange portion 14b is provided with through holes 24 through which the adjustment screws 21 pass. The lens holder 17 is provided with screw holes 25 to which the adjustment screws 21 are screwed. The adjustment screws 21 pass through the through holes 24 of the flange portion 14b and are screwed to the screw holes 25 of the lens holder 17. As shown in FIG. 2, extensions 6 are provided so as to cover the adjustment screws 24, as seen in a front view. Accordingly, the adjustment screws 21 are invisible from the outside.

Recesses 26 are respectively provided in the surfaces of the flange portion 14b and the lens holder 17, which are opposed to each other. The recesses 26 are opened so as to face each other. The springs 22 are accommodated in a state of being compressed in a longitudinal direction between the recesses 26 of the flange portion 14b and the recesses 26 of the lens holder 17. The springs 22 exert a force to the projection lens 14 and the lens holder 17 in a direction of separating the projection lens 14 and the lens holder 17.

As shown in FIG. 1, the adjustment screws 21 are provided in an upper portion, a lower portion, a left portion and a right portion of the flange portion 14b, as seen in a front view. Therefore, the projection lens 14 can be tilted upward when the adjustment screw 21 on the upper portion is fastened and the screw 21 on the lower portion is released, for example.

In addition to tilting the projection lens 14 in the vertical direction, the lens driving mechanism 20 of the present embodiment can tilt the projection lens 14 in the lateral direction or adjust a distance between the projection lens 14 and the shade part 13. For example, the projection lens 14 can be tilted to the left direction when the adjustment screw 21 on the left portion is fastened and the adjustment screw 21 on the right portion is released. For example, the projection lens 14 can be close to the shade part 13 when all of the adjustment screws 21 are fastened to the same extent.

In this way, according to the vehicle lamp 1 of the present embodiment, it is possible to adjust the positions of the irradiation regions which are formed by the lamp unit 10 since the lamp unit 10 includes the lens driving mechanism 20.

(Optical Sensor)

As shown in FIG. 2 and FIG. 3, the lens driving, mechanism 20 includes an optical sensor 18. The optical sensor 18 is attached to an upper portion of the lens holder 17. The optical sensor 18 can detect the intensity of light emitted from the laser diode 11a. The optical sensor 18 is connected to a control unit that controls an output of the laser diode 11a.

The control unit may be provided in the inside of the lamp chamber S or may be provided in the outside of the lamp chamber S. The control unit may be a portion of the vehicle lamp 1 or a function of the control unit may be combined to an ECU (Electric Control Unit) mounted to a vehicle.

An optical filter 19 is provided between the optical sensor 18 and the laser diode 11a. In the example shown, the optical filter 19 is fixed to a lower side of the optical sensor 18 in the upper portion of the lens holder 17.

Light having the same wavelength as the light emitted from the laser diode 11a is allowed to be transmitted through the optical filter 19 and light having the other wavelength is blocked by the optical filter 19. Therefore, the light having the same wavelength as the light emitted from the laser diode 11a, reaches the optical sensor 18. In a normal lighting state, light having constant intensity is incident on the optical sensor 18.

The optical sensor 18 can detect the breakage of the phosphor layer 11b. When the phosphor layer 11b is broken, the light emitted from the laser diode 11a is emitted without being attenuated by the phosphor layer 11b. Therefore, the optical sensor 18 receives high-intensity light, as compared to a case where the phosphor layer 11b is normal. As a result, the control unit reduces the output of the laser diode 11a or stops the output of the laser diode 11a when the output value of the optical sensor 18 exceeds a critical value.

According to the present embodiment, the optical sensor 18 is provided in the lens holder 17 that is a part of the lens driving mechanism 20. Accordingly, it is not required to separately provide a structure for supporting the optical sensor 18.

In the above-described embodiment, an example has been described where the optical sensor 18 detects the intensity of light having the same wavelength as the light emitted from the laser diode 11a. However, the optical sensor 18 may detect light having the same wavelength as the fluorescence emitted from the phosphors. In this case, the intensity of light received by the optical sensor 18 is increased when the phosphor layer 11b is broken.

(Adjustment of Irradiation Region)

Figure 4A:
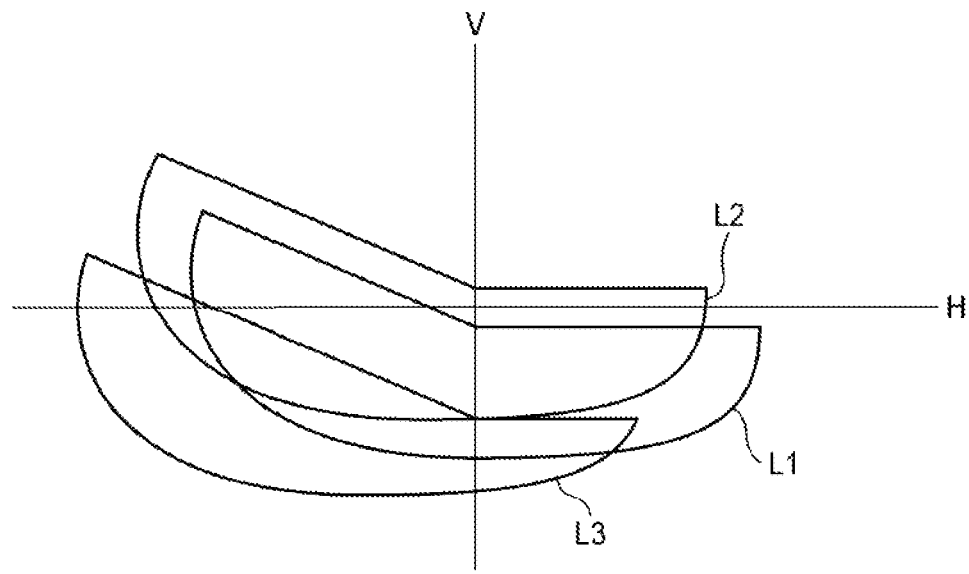
FIGS. 4A and 4B are views showing a light distribution pattern that is formed by the vehicle lamp shown in FIG. 1.
Figure 4B:
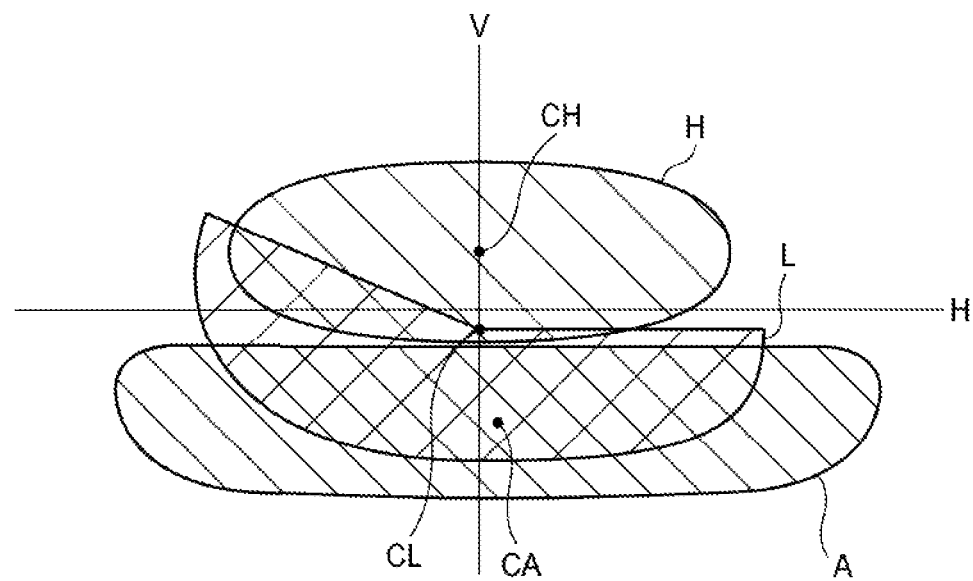

Next, a method of adjusting the positions of irradiation regions by using the lens driving mechanism 20 described above will be described. FIGS. 4A and 4B are views showing the irradiation regions that are formed by each lamp unit of the vehicle lamp 1.

FIG. 4A shows an example where a low-beam light distribution pattern is formed by irradiation regions formed by three lamp units 10. In the present embodiment, the irradiation regions formed by each lamp unit 10 are deviated from each other in a lateral direction. In this way, it is possible to irradiate a wide range in the lateral direction.

In a state where the vehicle lamp 1 is temporarily assembled, the positions in the vertical direction of the irradiation regions may be deviated from each other, as in FIG. 4A. Even in this case, the lens driving mechanism 20 can be used to displace the irradiation regions so that cutoff lines of each irradiation region are arranged in one straight line.

For example, in the present embodiment, a first lamp unit 10 forms an irradiation region L1, a second lamp unit 10 forms an irradiation region L2, and a third lamp unit 10 forms an irradiation region L3. When the irradiation region L1 is formed at a proper height position as shown, a screwing amount of the adjustment screw 21 of the second lamp unit 10 is adjusted so that the irradiation region L2 is moved downward. Further, a screwing amount of the adjustment screw 21 of the third lamp unit 10 is adjusted so that the irradiation region L3 is moved upward.

In this way, the positions in the vertical direction of the cutoff lines of the irradiation regions L1 to L3 are aligned, so that it is possible to form a light distribution pattern that does not give a discomfort to a driver.

In this way, according to the vehicle lamp 1 of the present embodiment, the deviation of the irradiation regions can be eliminated by the lens driving mechanism 20 without improving the assembly accuracy or the component accuracy of the projection lens 14 and the light source unit 11 or the like. As a result, it is possible to form a light distribution pattern having a desired shape.

Further, it is not required to move the entire vehicle lamp 10 so as to displace the irradiation regions. The irradiation regions can be displaced just by changing, the posture of the projection lens 14. Namely, the lens driving mechanism 20 can ensure a driving force required to move the projection lens 14 and rigidity required to hold the posture of the projection lens 14. Therefore, the lens driving mechanism 20 can be configured in a small size, as compared to a case where the entire vehicle lamp 10 is moved so as to displace the irradiation regions. As a result, the size of the entire vehicle lamp 1 is less likely to be larger.

Further, in the vehicle lamp 1 of the present embodiment, an area of the projection lens 14 is 1000 mm$^2$ or less, as seen in a front view. Generally, in a vehicle lamp where a plurality of small lamp units including a small lens is mounted, a deviation of the irradiation regions formed by each of the lamp units is liable to occur. However, according to the vehicle lamp 1 of the present embodiment, the lens driving mechanism 20 can be used to align multiple irradiation regions into a desired shape. Further, since the projection lens 14 is lightweight, it is possible to reduce a driving force of the lens driving mechanism 20.

Further, in the vehicle lamp 1 of the present embodiment, the projection lens 14 is made of resin. The projection lens 14 is lightweight, as compared with a lens made of glass. Accordingly, a force required for driving the projection lens 14 is small, so that the lens driving mechanism 20 can be configured in a small size.

In the above-described embodiment, an example has been described where each of three lamp units 10 forms an irradiation region having the same shape. However, each of three lamp units 10 may form an irradiation region having a shape different from each other.

FIG. 4B shows an example where each of three lamp units 10 forms an irradiation region having a shape different from each other and one light distribution pattern is formed by three irradiation regions. In the example shown, the first lamp unit 10 forms a first irradiation region L constituting a low-beam light distribution pattern, the second lamp unit 10 forms a second irradiation region H constituting a high-beam light distribution pattern, and the third lamp unit 10 forms a third irradiation region A. The third irradiation region forms an auxiliary light distribution pattern that is optimal to illuminate a road surface near one's own vehicle. The vehicle lamp 1 realizes a light distribution pattern having high visibility by combining the first to third irradiation regions L to A.

In this example, in a state where the vehicle lamp 1 is temporarily assembled the vertical positions of a center position CL of the first irradiation region L, a center position CH of the second irradiation region H and a center position CA of the third irradiation region A may be deviated from each other. Even in this case, the lens driving mechanism 20 can be used to form the first to third irradiation regions L to A at optimal positions. Further, a positional deviation in the lateral direction can be also adjusted when the lens driving mechanism 20 shown in FIG. 3 is used.

Figure 5B:
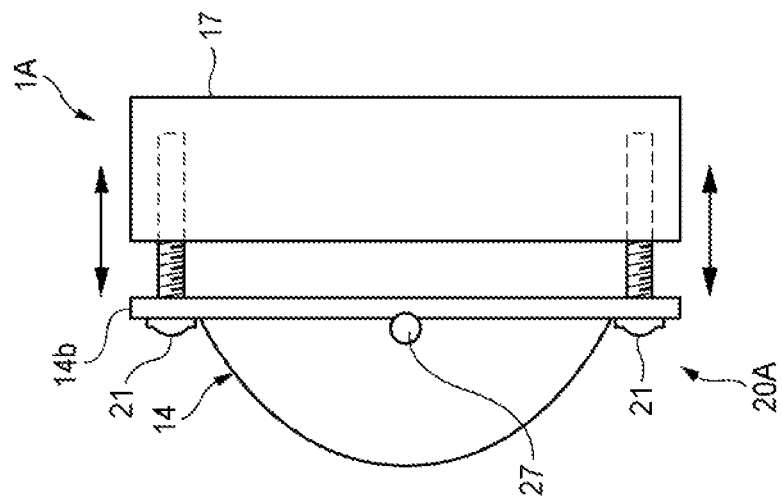
FIGS. 5A and 5B are views showing a portion of a vehicle lamp according, to a first modified example of the present invention.
Figure 5A:
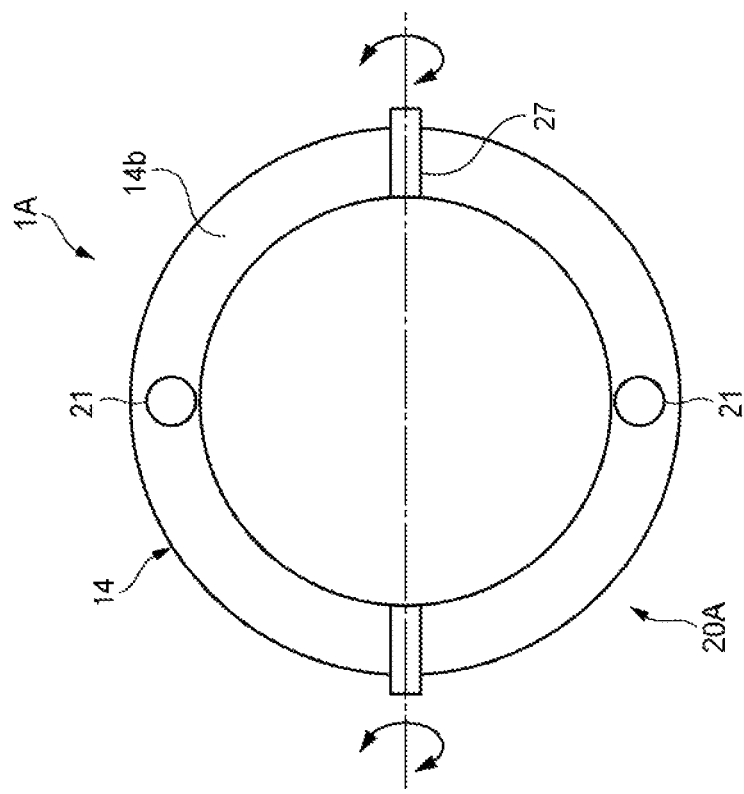

The lens driving mechanism for tilting the projection lens in the vertical direction is not limited to the configuration described above. FIGS. 5A and 5B are views showing a portion of a vehicle lamp IA according to a first modified example of the present invention. FIG. 5A is a partial front view of the vehicle lamp IA and FIG. 5B is a partial side view of the vehicle lamp IA. As shown in FIGS. 5A and 5B, a lens driving mechanism 20A includes a rotating shaft portion 27, an upper adjustment screw 21 and a lower adjustment screw 21. The rotating shaft portion 27 is provided in the flange portion 14b of the projection lens 14 and extended in the horizontal direction. The adjustment of the upper and lower adjustment screws 21 causes the projection lens 14 to be rotated around the rotating shaft portion 27, so that the projection lens 14 can be tilted in the vertical direction.

Alternatively, the lens driving mechanism may be configured as shown in FIGS. 6A and 6B. FIGS. 6A and 6B are views showing a portion of a vehicle lamp 1B according to a second modified example of the present invention. FIG. 6A is a partial front view of the vehicle lamp 1B and FIG.

6B is a partial side view of the vehicle lamp 1B. A lens driving mechanism 20B shown in FIGS. 6A and 6B includes the rotating shaft portion 27 and a step motor 29. The rotating shaft portion 27 is provided in the flange portion 14b of the projection lens 14 and extended in the horizontal direction. The step motor 29 is connected to the rotating shaft portion 27 through a gear 28. As the rotating shaft portion 27 is rotated by the step motor 29, the projection lens 14 is rotated around the rotating shaft portion 27, so that the projection lens 14 can be tilted in the vertical direction. In this case, the lens driving mechanism 20B is controlled by a control unit provided in a lamp or a vehicle, so that the tilting in the vertical direction of the projection lens 14 can be adjusted.

In the above-described embodiment, a lens part has been described which has a circular shape, as seen in a front view. However, the projection lens may have a rectangular shape or a polygonal shape, as seen in a front view.

In the above-described embodiment, an example has been described where a laser diode is used as a semiconductor light emitting element. However, the present invention is not limited thereto. For example, an LED element or EL element may be used.

The number of the plurality of the lamp units is not limited to three. The vehicle lamp may include any number (two or more) of lamp units. Further, an arrangement direction of the plurality of the lamp units is not limited to the horizontal direction. The plurality of the lamp units may be arranged in the vertical direction or may be arranged in a matrix shape in rows and columns.

Furthermore, in the above-described embodiment, an example has been described where the positions of the irradiation regions are adjusted after the vehicle lamp is temporarily assembled. The present invention is not limited thereto. A control of aligning the positions of the irradiation regions may be executed at the start of an engine or at the turning-on of the vehicle lamp, etc.

Further, the lens driving mechanism may be used to displace the irradiation regions during the lighting, thereby changing the light distribution pattern.

Further, all of the plurality of the lamp units may not include the lens driving mechanism. At least one of the plurality of the lamp units may include the lens driving mechanism.

What is claimed is:

1. A vehicle lamp comprising:
    a plurality of lamp units each comprising a light source and a projection lens configured to emit light emitted from the light source to the front,
    wherein the plurality of lamp units form a light distribution pattern by combining irradiation regions formed by each lamp unit,
    at least one of the lamp units has a lens driving mechanism configured to tilt the projection lens in a vertical direction, and
    the lens driving mechanism has a sensor configured to detect the light emitted from the light source.

2. The vehicle lamp according to claim 1, wherein an area of the projection lens is 1000 mm$^2$ or less, as seen in a front view.

3. The vehicle lamp according to claim 1, wherein the projection lens is made of resin.

4. The vehicle lamp according to claim 1, wherein the light source comprises a semiconductor light emitting element and a phosphor layer having phosphors to emit fluorescence by receiving the light emitted from the semiconductor light emitting element, and
    the sensor detects at least one of the intensity of the light emitted from the semiconductor light emitting element and the intensity of the fluorescence.

* * * * *